United States Patent
Perry et al.

(10) Patent No.: US 7,320,003 B2
(45) Date of Patent: Jan. 15, 2008

(54) METHOD AND SYSTEM FOR STORING AND RETRIEVING DOCUMENT DATA USING A MARKUP LANGUAGE STRING AND A SERIALIZED STRING

(75) Inventors: Timothy Patrick Jon Perry, Lynchburg, VA (US); Nagesh Prabhu Palimar, Lynchburg, VA (US); Milan K. Das, Lynchburg, VA (US)

(73) Assignee: Genworth Financial, Inc., Richmond, VA (US)

( * ) Notice: Subject to any disclaimer, the term of this patent is extended or adjusted under 35 U.S.C. 154(b) by 451 days.

(21) Appl. No.: 10/777,728

(22) Filed: Feb. 13, 2004

(65) Prior Publication Data

US 2005/0182779 A1    Aug. 18, 2005

(51) Int. Cl.
*G06F 17/30* (2006.01)
(52) U.S. Cl. .......................... 707/101; 707/3; 707/100
(58) Field of Classification Search ............. 707/104.1, 707/3, 100, 102, 101; 715/513
See application file for complete search history.

(56) References Cited

U.S. PATENT DOCUMENTS

| | | | |
|---|---|---|---|
| 5,649,085 A | 7/1997 | Lehr | |
| 5,664,109 A | 9/1997 | Johnson | |
| 5,758,341 A | 5/1998 | Voss | |
| 5,870,733 A | 2/1999 | Bass | |
| 5,907,848 A | 5/1999 | Zaiken | |
| 5,970,464 A | 10/1999 | Apte | |
| 6,014,676 A | 1/2000 | McClain | |
| 6,044,352 A | 3/2000 | Deavers | |
| 6,144,941 A | 11/2000 | Hotti | |
| 6,185,555 B1 | 2/2001 | Sprenger | |
| 6,223,094 B1 | 4/2001 | Muehleck | |
| 6,449,624 B1* | 9/2002 | Hammack et al. | 707/203 |
| 6,529,876 B1 | 3/2003 | Dart | |
| 6,538,831 B1 | 3/2003 | Ikeda | |
| 6,549,888 B1 | 4/2003 | Aieta et al. | |
| 6,594,668 B1 | 7/2003 | Hudy | |
| 6,826,539 B2 | 11/2004 | Loveland | |
| 6,829,584 B2 | 12/2004 | Loveland | |
| 6,862,571 B2 | 3/2005 | Martin | |
| 6,886,061 B2 | 4/2005 | Yokota | |
| 6,970,827 B2 | 11/2005 | Zeltzer | |
| 7,013,298 B1 | 3/2006 | De La Huerga | |
| 2001/0056433 A1 | 12/2001 | Adelson | |
| 2002/0026335 A1 | 2/2002 | Honda | |
| 2002/0099712 A1* | 7/2002 | Brandin et al. | 707/100 |
| 2002/0107866 A1* | 8/2002 | Cousins et al. | 707/102 |
| 2002/0128880 A1 | 9/2002 | Kunikiyo | |
| 2002/0188467 A1 | 12/2002 | Eke | |
| 2002/0194033 A1 | 12/2002 | Huff | |
| 2003/0036927 A1 | 2/2003 | Bowen | |
| 2003/0065539 A1 | 4/2003 | Kay | |

(Continued)

*Primary Examiner*—Cam Linh Nguyen
(74) *Attorney, Agent, or Firm*—Hunton & Williams

(57) ABSTRACT

A method and system for storing data entered by a user in a remote relational database involves saving data as a plurality of software components at a server; converting the plurality of software components into a first string and a second string wherein the first string comprises a markup language format that substantially mimics the software components and the second string comprises a serialized string format of the plurality of software components; compressing the first string and the second string; transmitting the compressed first string and the compressed second string to a receiving server; and storing the compressed first string and the compressed second string in a relational database.

24 Claims, 5 Drawing Sheets

U.S. PATENT DOCUMENTS

| | | |
|---|---|---|
| 2003/0074235 A1 | 4/2003 | Gregory |
| 2003/0088443 A1 | 5/2003 | Majikes |
| 2003/0101081 A1 | 5/2003 | Putnam |
| 2003/0204421 A1 | 10/2003 | Houle |
| 2004/0093241 A1 | 5/2004 | Stone |
| 2004/0143791 A1* | 7/2004 | Ito et al. ............... 715/513 |
| 2004/0186749 A1 | 9/2004 | Iwuagwu |
| 2004/0193455 A1 | 9/2004 | Kellington |
| 2004/0243449 A1 | 12/2004 | Neustadt |
| 2005/0071181 A1 | 3/2005 | Christ |
| 2005/0080649 A1 | 4/2005 | Alvarez |
| 2005/0102170 A1 | 5/2005 | Lefever |
| 2005/0137911 A1 | 6/2005 | Conn |
| 2005/0177401 A1 | 8/2005 | Koeppel |
| 2005/0182666 A1 | 8/2005 | Perry |
| 2005/0182667 A1 | 8/2005 | Metzger |
| 2005/0182669 A1 | 8/2005 | Tinnirello |
| 2005/0187798 A1 | 8/2005 | Conn |
| 2006/0080153 A1 | 4/2006 | Fox |

\* cited by examiner

```xml
<object name="root" type="com.gefa.genius.vo.formdata.appprofile.AppProfileFDVO" id="idpc-p41931053067302947852323183:210">
  <attribute name="appProfileSpecialCaseContactInfoFDCollectionVO" idref="idpc-p41931053067302947852323183:10031"/>
  <attribute name="appProfileSpecialDatingRequestFDCollectionVO" idref="idpc-p41931053067302947852323183:10032"/>
  <attribute name="appProfileCompanionsFDCollectionVO" idref="idpc-p41931053067302957846936699:10033"/>
  <attribute name="appProfileAdditionalCoverageFDCollectionVO" idref="idpc-p41931053067302957846936699:10034"/>
  <attribute name="appProfileAlternateCoverageFDCollectionVOIsBlank" type="java.lang.Boolean">false</attribute>
  <attribute name="appProfileAlternateCoverageFDCollectionVOIsAltered" type="java.lang.Boolean">false</attribute>
  <attribute name="appProfileAlternateCoverageFDCollectionVOIsUnreadable" type="java.lang.Boolean">false</attribute>
  <attribute name="appProfileAlternateCoverageFDCollectionVOIsMaskOveride" type="java.lang.Boolean">false</attribute>
  <attribute name="appProfileAlternateCoverageFDCollectionVOIsRemarks" type="java.lang.Boolean">false</attribute>
  <attribute name="appProfileAlternateCoverageFDCollectionVOIsModified" type="java.lang.Boolean">false</attribute>
  <attribute name="appProfileAlternateCoverageFDCollectionVOIsNoAmendment" type="java.lang.Boolean">false</attribute>
  <attribute name="appProfileAlternateCoverageFDCollectionVODH" type="java.lang.String">0000000</attribute>
  <attribute name="appProfileAlternateCoverageFDCollectionVO" idref="idpc-p41931053067302957846936699:10035"/>
  <attribute name="appProfileRequirementFDCollectionVO" idref="idpc-p41931053067302957846936699:10036"/>
  <attribute name="appProfileMainFDVO" idref="idpc-p41931053067302967856940170:217"/>
</object>
```

FIG. 5

METHOD AND SYSTEM FOR STORING AND RETRIEVING DOCUMENT DATA USING A MARKUP LANGUAGE STRING AND A SERIALIZED STRING

FIELD OF THE INVENTION

The embodiments of the invention relate generally to storing and retrieving data, and more specifically to a method and system for storing and retrieving data by using a first markup language string and a second serialized string based on software components that capture the entered data.

BACKGROUND OF THE INVENTION

Current existing frameworks for handling storing, transporting and processing large amounts of data are too slow for certain applications that require quick responses. Business processing systems are generally not well equipped to effectively handle the volume of user transactions. As a result, individual users do not receive reasonable response times when documents are large in size. Further, various business needs are not met. In the past, the focus has generally been to produce bigger and faster computers. However, this solution is cost prohibitive and potentially an impossible option.

In the insurance industry, much of the data entering may be performed at a remote location, oftentimes overseas. With large insurance applications, the amount of time to enter the data and then save the entered data where the data is saved at another location, across continents, takes a long time to complete. Due to the delay in entering data and additional delay considerations of different time zones, communication between the data entry actions and the storing actions may be impaired. Therefore, the response time after document data is received at a receiving facility is prolonged thereby preventing immediate quick responses that are oftentimes necessary. Current document saving mechanisms generally involve XML parsers that further delay the storage of data. In addition, current procedures involve separating document data into separate fields that require additional processing and time delays. As a result, various inefficiencies result due to these delays.

Other drawbacks may also be present.

BRIEF DESCRIPTION OF THE INVENTION

Accordingly, one aspect of the invention is to address one or more of the drawbacks set forth above.

According to an exemplary embodiment of the invention, a method for storing data entered by a user in a remote relational database comprises the steps of saving data as a plurality of software components at a server; converting the plurality of software components into a first string and a second string wherein the first string comprises a markup language format that substantially mimics the software components and the second string comprises a serialized string format of the plurality of software components; compressing the first string and the second string; transmitting the compressed first string and the compressed second string to a receiving server; and storing the compressed first string and the compressed second string in a relational database.

According to another exemplary embodiment of the invention, a method for retrieving data from a remote relational database, as requested by a user at a user location comprises the steps of requesting data from a relational database through a requesting server; retrieving a compressed first string and a compressed second string from a relational database; transmitting the compressed first string and the compressed second string to the requesting server; decompressing the compressed first string and the compressed second string; converting the second string to an original plurality of software components wherein the second string represents a serialized string format of the plurality of software components comprising a string of characters; determining whether the second string was converted; converting the first string to an original plurality of software components if the second string was not converted, wherein the first string represents a markup language format that substantially mimics the software components; and displaying the original plurality of software components via a user interface.

According to another exemplary embodiment of the invention, a system for storing data entered by a user in a remote relational database comprises a server for saving data as a plurality of software components wherein the data is entered by the user; a convert module for converting the plurality of software components into a first string and a second string wherein the first string comprises a markup language format that substantially mimics the software components and the second string comprises a serialized string format of the plurality of software components; a compress module for compressing the first string and the second string; a transmit module for transmitting the compressed first string and the compressed second string to a receiving server; and a relational database for storing the compressed first string and the compressed second string.

According to another exemplary embodiment of the invention, a system for retrieving data from a remote relational database, as requested by a user at a user location comprises a requesting server for requesting data from a relational database; a retrieve module for retrieving a compressed first string and a compressed second string from a relational database; a transmit module for transmitting the compressed first string and the compressed second string to the requesting server; a decompress module for decompressing the compressed first string and the compressed second string; a convert module for converting the second string to an original plurality of software components wherein the second string represents a serialized string format of the plurality of software components comprising a string of characters; determining whether the second string was converted; and converting the first string to an original plurality of software components if the second string was not converted, wherein the first string represents a markup language format that substantially mimics the software components; and a user interface for displaying the original plurality of software components.

According to another exemplary embodiment of the invention, at least one signal embodied in at least one carrier wave for transmitting a computer program of instructions configured to be readable by at least one processor to execute a computer process for storing data entered by a user in a remote relational database comprises saving means for saving data as a plurality of software components at a server; converting means for converting the plurality of software components into a first string and a second string wherein the first string comprises a markup language format that substantially mimics the software components and the second string comprises a serialized string format of the plurality of software components; compressing means for compressing the first string and the second string; transmitting means for transmitting the compressed first string and the compressed second string to a receiving server; and storing means for storing the compressed first string and the compressed second string in a relational database.

According to another exemplary embodiment of the invention, at least one signal embodied in at least one carrier wave for transmitting a computer program of instructions configured to be readable by at least one processor to execute a computer process for retrieving data from a remote relational database, as requested by a user at a user location, comprises requesting means for requesting data from a relational database through a requesting server; retrieving means for retrieving a compressed first string and a compressed second string from a relational database; transmitting means for transmitting the compressed first string and the compressed second string to the requesting server; decompressing means for decompressing the compressed first string and the compressed second string; converting means for converting the second string to an original plurality of software components wherein the second string represents a serialized string format of the plurality of software components comprising a string of characters; determining means for determining whether the second string was converted; converting means for converting the first string to an original plurality of software components if the second string was not converted, wherein the first string represents a markup language format that substantially mimics the software components; and displaying means for displaying the original plurality of software components via a user interface.

BRIEF DESCRIPTION OF THE DRAWINGS

FIG. 5 is an illustrative example of a markup language format, according to an embodiment of the invention.

DETAILED DESCRIPTION OF THE INVENTION

Figure 1:
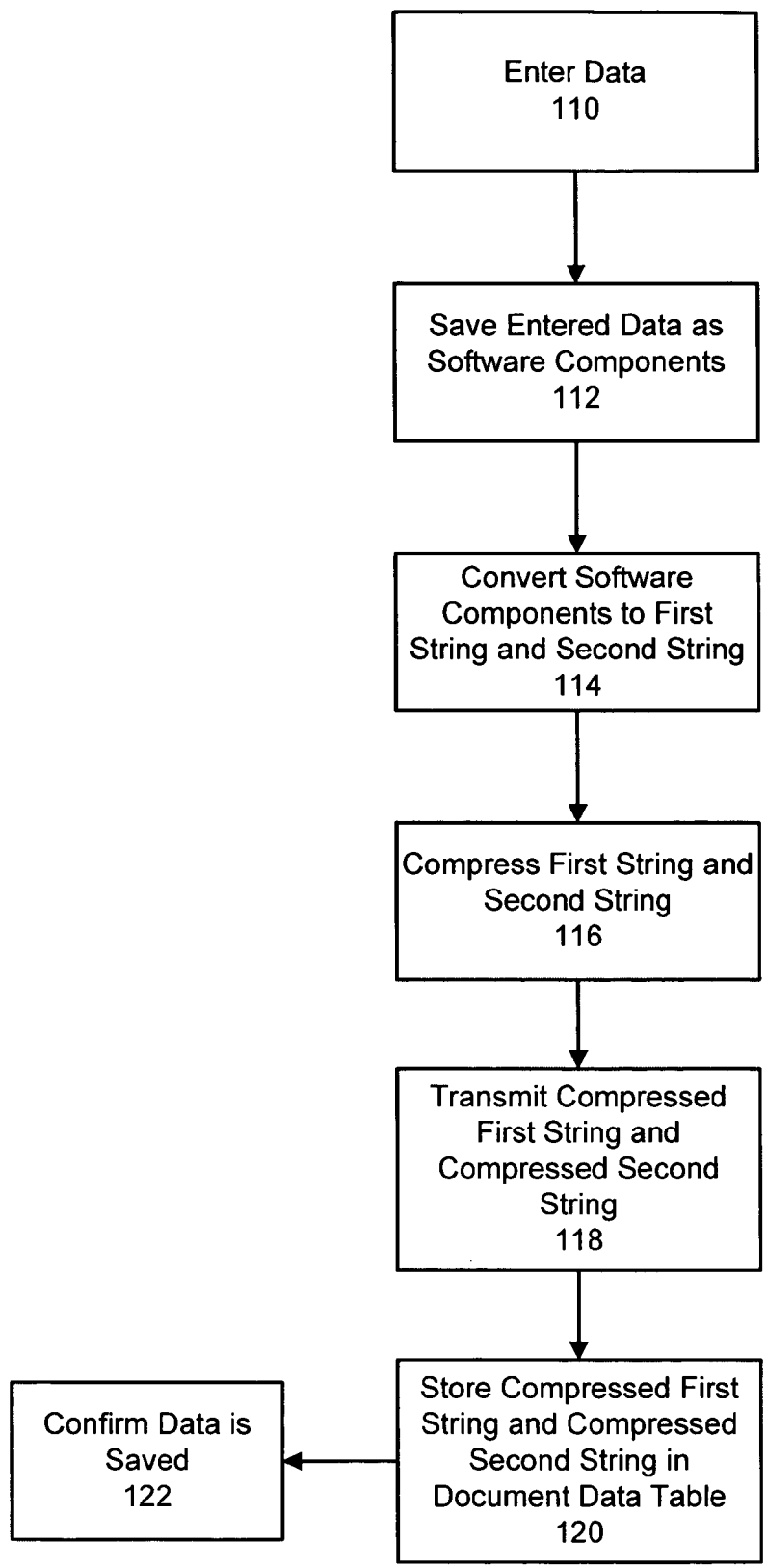
FIG. 1 is an exemplary flowchart illustrating a method for saving document data, according to an embodiment of the invention.

An embodiment of the invention is directed to providing a framework for effectively and rapidly storing and/or transporting document data to/from a data store, such as a relational database or other type of database or storage device. The transport of document data may span long distances where large, sizeable amounts of data may be stored and/or retrieved quickly. Accordingly, a technical effect for the disclosed inventive technology is to provide systems and methods for storing and retrieving data by using a first markup language string and a second serialized string based on software components that capture the entered data, as set forth in the Brief Description of the Invention, above.

Portions of, or the entire framework, may be adapted to many different situations and applications. For example, within the insurance industry, large amounts of data within documents are regularly transported and responded to within seconds or minutes. For example, documents may include applications for insurance, medical information documents as well as other documents that involve approving someone for insurance. However, any industry that involves storing, transporting and/or processing data may utilize the framework of the various embodiments of the invention.

Various embodiments of the invention may provide a portable framework with platform, computer language and document agnostic methods for rapidly storing and retrieving document data. The flexibility of the framework allows for use of computer language unique features that may otherwise be risky or difficult to implement. Computer network friendly features enable information to traverse large distances, even continents, if desired. By compressing the data, the total data size may be kept to a minimum. The framework of an embodiment of the invention may be generalized and useable by various industries and applications. The framework may also be beneficial for asynchronous processing, which allows the collection of data and transport of data to cleanly become separate activities from the processing of data. More specifically, collection of data, transport of data and data processing may be separate and distinct processes. An embodiment of the invention allows separate computer systems to work together where a data entry system may interact with a data processing system on completely different platforms.

Extensible Markup Language (XML) refers to representing information in a way that is normally reasonably easy for a person to read, yet prepared in a way that a computer can parse the information into meaningful pieces. A markup language, which may be a version of XML, may refer to an XML built language for quick parsing to and from information stores in computer memory where the markup language may be opposed to highly human readable XML. The markup language of an embodiment of the invention closely represents the data stored in computer memory where the markup language format mimics the software components. As a result, data may be saved and/or retrieved more quickly and easily.

FIG. 1 is an exemplary flowchart illustrating a method for saving document data, according to an embodiment of the invention. At step 110, data may be entered by a user through a device, such as a computer or other device capable of inputting data, including mobile, wireless, and/or other devices. For example, a user may enter a multi-page document into a data entry system. As the data is being entered, the data may be continuously stored. At step 112, the entered data may be saved as a collection of software components. According to an exemplary embodiment, the software components may include JavaBeans™ which may include a piece of Java™ code intended to store information in the computer's memory. For example, the data may be stored as a collection of JavaBeans™, with one primary JavaBean™ as a top-level information storage. Other programming languages with associated software components may also be used where other formats may be implemented. Once the user completes the data entry, the user may then click on a submit icon, for example, on the computer screen.

At step 114, the data may be converted into a first string (e.g., markup language string) and a second string (e.g., serialized string). Upon submission of the data, the device (e.g., computer, etc.) may take a top-level software component and translate the software components (including the associated child components, etc.) into a markup language format using string concatenation. For example, software components may include an attribute with an associated value (e.g., Name=John). String concatenation may involve iterating through each attribute and each value and concatenating the attributes and the values together in a markup language format. The markup language format may represent the first string. According to an embodiment of the invention, an XML parser or other type of parser may not be required during the conversion process of step 114. XML parsers may include computer software built specifically to translate XML documents and/or data to and from computer language specific information storage. The collection of software components may then be serialized into a single serialized string, which may involve converting the software components into a string of characters. The serialized string may or may not be language specific. This string of characters may represent the second string.

At step 116, the first string (e.g., markup language string) and the second string (e.g., serialized string) may be compressed. For example, the first string and the second string may be zipped into a much smaller footprint. Other compression and/or optional encryption mechanisms may be implemented. At step 118, the compressed first string and the compressed second string may be transmitted to a receiving device (e.g., computer, application server, database server, etc.). For example, the compressed data strings may be ultimately sent to a database server. In another example, the compressed data strings may be sent to an application server and then forwarded to a database server. Other options may be implemented.

At step 120, the database server may store the first string and the second string in a table, such as document data table. For example, the document data table may store the data in a single row within a single table. Other storage formats may be implemented. For example, the column that holds the compressed data may be of a Binary Large Object (BLOB) data type. BLOB may represent a binary large object that is a relational database data type that may store various information in a binary format. Other data types and other formats may be implemented. The data to be stored may be of any form. In this example, the BLOB data type implies a single database record, regardless of how much data there is (e.g., up to the database vendor BLOB limit). The transaction from the user is now complete and the entire set of data is now in the database, which makes for a very quick transaction for the amount of data that may be involved. At step 122, a confirmation message may be sent to the user (or other intended recipient) to indicate that the data has been saved. The user may move on to the next data entry task or other task.

Figure 2:
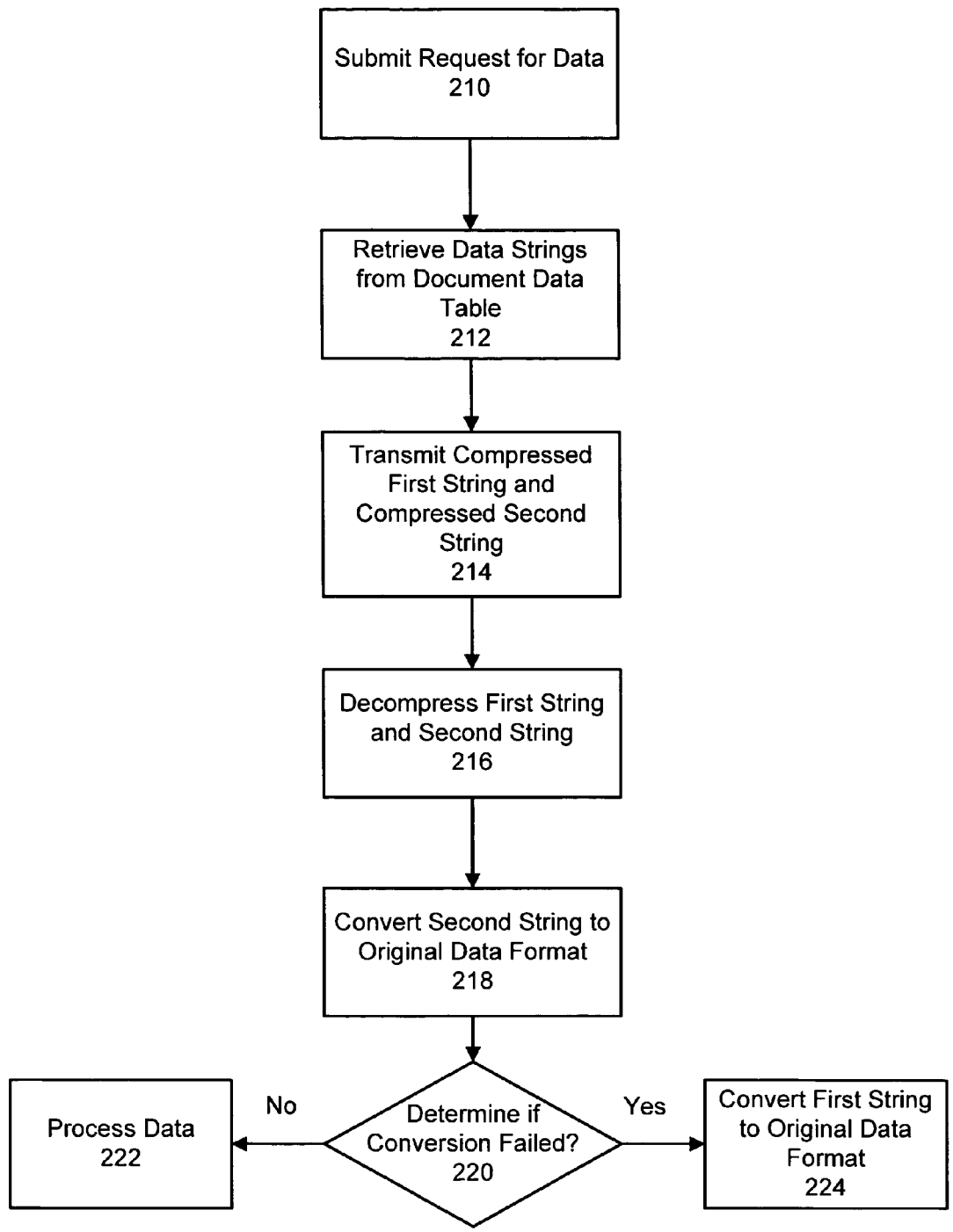
FIG. 2 is an exemplary flowchart illustrating a method for retrieving document data, according to an embodiment of the invention.

FIG. 2 is an exemplary flowchart illustrating a method for retrieving document data, according to an embodiment of the invention. To further process the stored data, the data may be read from the database and then processed as desired. Another embodiment of the invention is directed to reading and preparing the data for processing. At step 210, a user may submit a request for document data, through a device, such as a computer. At step 212, an associated server (e.g., application server, database server, etc.) may retrieve data strings from a database (e.g., a relational database). For example, the data may be retrieved from a row and column of data from the document data table. Other storage formats may be implemented. The data stored in the document data table may be stored as a compressed first string (e.g., markup language string) and a compressed second string (e.g., serialized string). According to an exemplary embodiment, the retrieval may be performed by using Java™ and Java™ Database Connectivity (JDBC). JDBC may represent a portion of the Java™ language that may be used to interact with relational databases. Other retrieval mechanisms may be implemented. For example, if a different type of software is used, a retrieval mechanism specific to that software may be implemented. At step 214, the compressed data may be transmitted to the requesting device, through an application server or other server, for example. In this example, the requesting device may include a web server associated with the computer submitting the request for data. At step 216, the compressed first string (e.g., markup language string) and the compressed second string (e.g., serialized string) may be decompressed where the decompressing may be performed at the web server.

At step 218, the second string may be converted. For example, the serialized string may be de-serialized or otherwise converted to the original components, e.g., original software components. According to one example, the serialized string may be converted to the original JavaBeans™. In this example, the Java™ based de-serialization is much faster than XML parsers. However, there are risks associated with this process. For example, de-serialization may be impaired or fail due to upgrades to software, changes to the software application code and/or other similar conditions. At step 220, it may be determined whether the conversion of step 218 has failed. If the conversion is successful, the data may be processed, at step 222. If the conversion of step 218 fails, the original components, e.g., the original software components, may be immediately recreated from the first string, at step 224. As this process is software version agnostic, there is minimal or essentially no risk of failure. Also, while slower than de-serialization, the markup language conversion of the first string is faster than XML parsing because the XML data tag names in the markup language format is an exact or substantially similar match to software component attributes; in this exemplary case, the JavaBean™ attribute names. Therefore, simple code may traverse the markup language format to translate from a tag to a software component attribute (e.g., a JavaBean™ attribute) without complicated code, while using XML "SAX" parsing. SAX parsing may refer to a feature of XML parsers that may read an XML file a tag at a time and enables a business logic process on that single tag, line or other portion of the information. According to an exemplary application, Java™ reflection may be used to create appropriate Java™ objects with the right Java™ attribute values where minimal or no complex condition logic is needed. Once the associated software components (e.g., related JavaBeans™) have been recreated, further processing of the data may continue.

Figure 3:
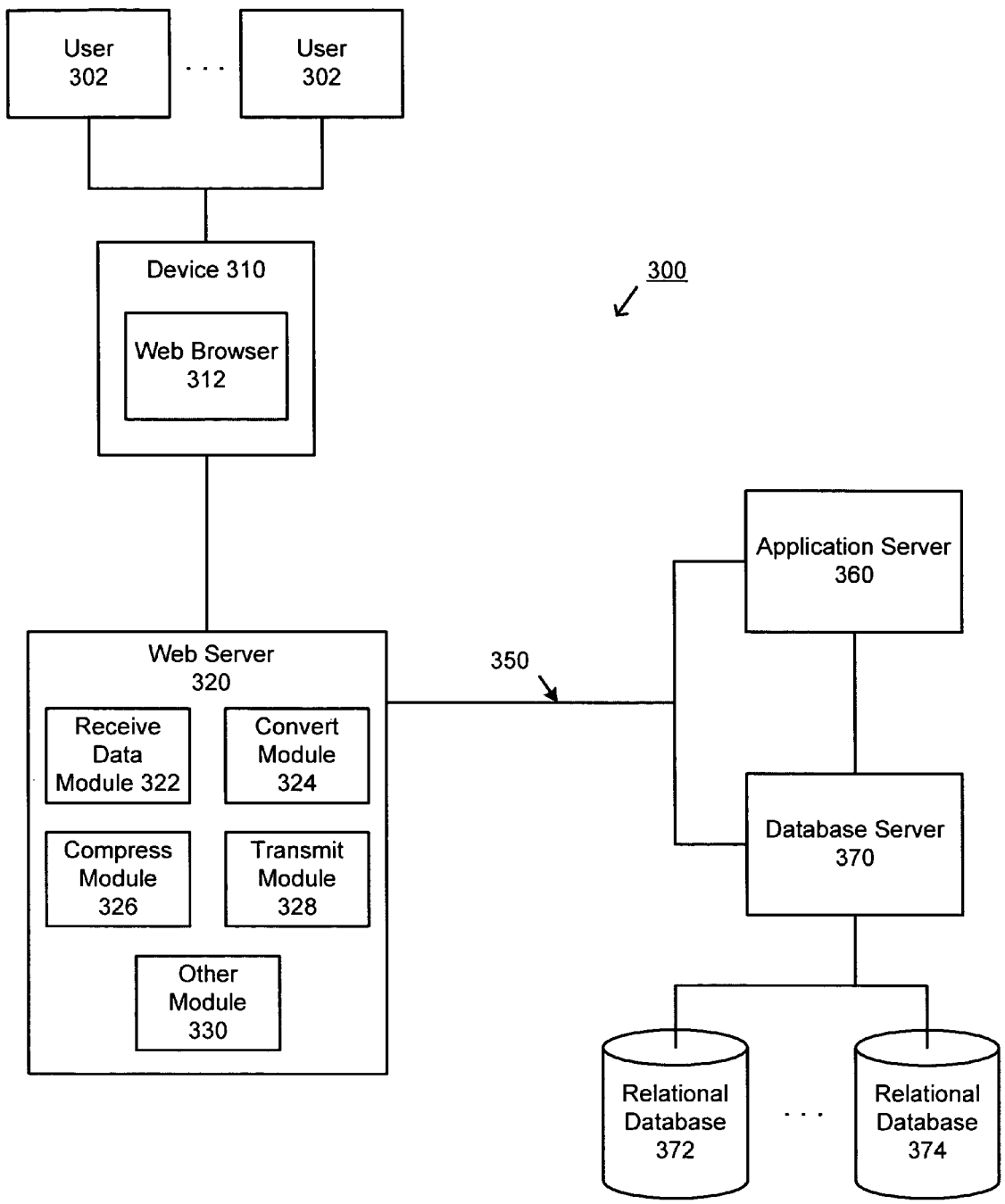
FIG. 3 is an exemplary system diagram illustrating a system for saving document data, according to an embodiment of the invention.

FIG. 3 is an exemplary system diagram illustrating a system for saving document data, according to an embodiment of the invention. System 300 for saving document data may include users 302, 304, device 310, web server 320, communication link 350, application server 360, database server 370 and/or relational databases 372, 374. Other components may be included within the system 300. While the components are illustrated as separate devices, the components of system 300 may be combined or further separated. In addition, multiple devices and/or components of system 300 may be implemented.

Device 310 may represent a computer or other device that may be used for data input. Device 310 may also include wireless devices (e.g., cell phone, PDA, etc.) and/or other devices capable of inputting data. In this exemplary illustration, device 310 may include a web browser 312, which may be part of device 310 or separate from device 310. In addition, multiple devices may be implemented with multiple web browsers.

Web Server 320 may include various modules for performing functions associated with saving and/or retrieving data, according to an embodiment of the invention. Web Server 320 may include Receive Data Module 322, Convert Module 324, Compress Module 326, Transmit Module 328 and/or other module 340. While the modules are represented as separate modules, the modules may be combined or further separated. In addition, while a single web server is shown, multiple web servers may be implemented. Further, the modules of Web Server 320 may function separately as well as in various combinations.

Web Server 320 may be connected to one or more servers through a communication link 350. Communication link 350 may support electronic communication, wireless communication and/or other modes of communicating information. Information may be transmitted through an electronic network, including the Internet, Intranet, Ethernet, and/or other types of networks. Application Server 360 and/or Database Server 370 may be implemented in system 300. Database Server 370 may store and/or retrieve data to/from relational databases 372, 374.

According to one exemplary embodiment, the device 310, web browser 312, web server 320 may be located in relative close proximity while application server 360, database server 370 and relational databases 372, 374 may be situated in relative close proximity. For example, the device 310 may be located at one continent while the relational databases 372, 374 may be located at a different continent where data may be saved and retrieved quickly and easily through the various embodiments of the invention.

According to an exemplary embodiment of the invention, a user 302 may input data through device 310. User 302, 304 may represent any user of device 310. As user 302 enters data, web server 312 may continue to collect the data in memory. For example, for a ten page document, user 302 may enter data on a page by page basis where the data is saved by web browser 312 as the user enters each page of data (or other portion of the document). At the completion of data input, a user may submit the data. For example, the user may select a submit icon or other similar form of activation.

Upon submission, Web server 320 may receive the data. Receive data module 322 may receive the data from web browser 312 where the data is saved as a collection of software components. Convert module 324 may convert the received data into a first string and a second string. The first string may represent the data in a markup language format. The second string may represent the data in a serialized string format. Compress module 326 may compress the first string and the second string in a compressed format through various types of compression, which may or may not include encryption. Transmit module 328 may transmit the compressed first string and the compressed second string to a server, such as an application server, database server and/or other type of server or receiving device, via communication link 350.

Application server 360 may receive the compressed first string and the compressed second string. Application server 360 may communicate with database server 370 to store the compressed first string and the compressed second string in a storage format, such as a document data table. The document data table may be stored at one or more relational databases 372, 374. The document data table may include various information, such as a document identifier (e.g., unique key, etc.), document type, version number, document data, date time and/or other information.

For example, document type column may be used to identify the document type to a host computer system and allows the possibility of different markup language formats. Each document may include a set of fields depending on the type of document. For example, a physician statement document may include certain attributes directed to medical history data. An application document may include other attributes associated with other relevant data. Other document types may involve other types of attributes. The document type may identify a plurality of attributes that may be expected from that type of document. Within the insurance industry, document type may include insurance application, medical information, motor vehicle reports, credit card applications, medical interviews, etc. For other industries and applications, other types of document types may be implemented.

Version number may identify different variations in a document. For example, some documents may have state specific requirements with different versions for different states. In another example, some documents may have different versions for each year, quarter, or other time period. Other variations may be implemented. Date time may refer to when the data was stored, edited or otherwise acted upon or modified. Other actions may be tracked as well. Document data column may represent the column that holds both the compressed first string (e.g., markup language string) and the compressed second string (e.g., serialized string). For example, the document data column may represent a BLOB column. The compressed first string and the compressed second string may be stored in a single row in a single table. Other storage formats may be used.

In another example, the compressed first string and the compressed second string may be transmitted from Web Server 320 directly to Database Server 370. Other variations may be realized through various embodiments of the invention.

Figure 4:
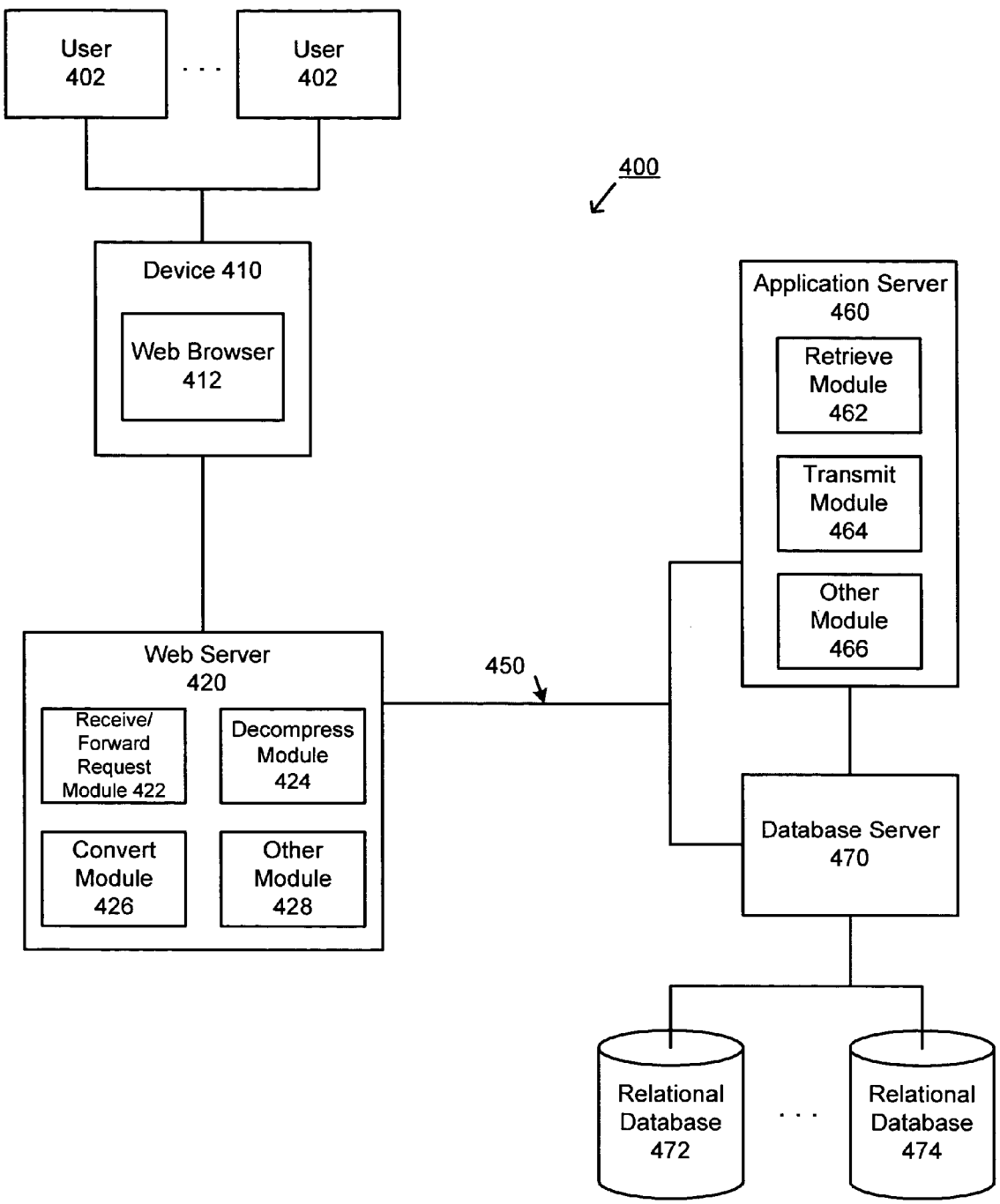
FIG. 4 is an exemplary system diagram illustrating a system for retrieving document data, according to an embodiment of the invention.

FIG. 4 is an exemplary system diagram illustrating a system for retrieving document data, according to an embodiment of the invention. While FIG. 3 and FIG. 4 are illustrated separately, the components of FIG. 3 and FIG. 4 may be combined as well. For example, the modules of Web Server 320 and Web Server 420 may be combined into a single web server.

System 400 for retrieving document data may include users 402, 404, device 410, web server 420, communication link 450, application server 460, database server 470 and/or relational databases 472, 474. Other components may be included within the system 400. While the components are illustrated as separate devices, the components of system 300 may be combined or further separated. In addition, multiple devices and/or components of system 400 may be implemented.

Device 410 may represent a computer or other device may be used for submitting a request. Device 410 may also include wireless devices (e.g., cell phone, PDA, etc.) and other devices capable of inputting data. In this exemplary illustration, device 410 may include a web browser 412, which may be part of device 410 or separate from device 410. In addition, multiple devices may be implemented with multiple web browsers. The device 310 for inputting data and the device 410 for requesting data may or may not be the same or somehow associated.

Web Server 420 may include various modules for performing functions associated with saving and/or retrieving data, according to an embodiment of the invention. Web Server 420 may include Receive/Forward Request Module 422, Decompress Module 424, Convert Module 426 and/or other module 428. While the modules are represented as separate modules, the modules may be combined or further separated. In addition, while a single web server is shown, multiple web servers may be implemented. Further, the modules of Web Server 420 may function separately as well as in various combinations.

Web Server 420 may be connected to one or more servers through a communication link 450. Communication link 450 may support electronic communication, wireless communication and/or other modes of communicating information. Information may be transmitted through an electronic network, including the Internet, Intranet, Ethernet, and/or other types of networks. Application Server 460 and/or Database Server 470 may be implemented in system 400. Application Server 460 may include various modules for performing functions associated with saving and/or retrieving data, according to an embodiment of the invention. Application Server 460 may include Retrieve Module 462, Transmit Module 464 and/or other module 466. While the modules are represented as separate modules, the modules may be combined or further separated. In addition, while a single application server is shown, multiple application servers may be implemented. Further, the modules of Application Server 460 may function separately as well as in various combinations. Database Server 470 may store and/or retrieve data to/from relational databases 472, 474.

According to an exemplary embodiment of the invention, a user 402 may request data retrieval through device 410. The data may be identified by selecting an icon, entering search terms, identifying document data information (e.g., document type, version, relationships, etc.), providing a document identifier, or other mechanism for identifying data or a document. The request for data may be presented in various formats. User 402, 404 may represent any user of device 410. User 402 may submit a request for the document data where the request may include a view data request. The request may be forwarded to Web Server 420 via Receive/Forward Request Module 422, which may then forward the request to Application Server 460 via communication link 450. Application Server 460 may receive the request and retrieve the saved document data, via Retrieve Module 462. Retrieve Module 462 may send a request to Database Server 470 to retrieve the compressed first string and the compressed second string from a table, such as a document data table, stored in Relational Database 472, 474. The document data table may include various information, such as a document identifier (e.g., unique key, etc.), document type, version number, document data, date time and/or other information. The compressed first string and the compressed second string may be retrieved from a single row in a single table. Other storage formats may be used.

After retrieving the data, Database Server 470 may forward the compressed first string and the compressed second string to Application Server 460. Transmit Module 464 of Application Server 460 may then transmit the compressed first string and the compressed second string to Web Server 420 via communication link 450.

Decompress module 424 may decompress the first string and the second string through various forms of decompression, which may or may not include decryption. Convert module 426 may convert the decompressed first string and the decompressed second string into an original format which may include a collection of software components. For example, the second string which may represent the data in a serialized string format may be converted to original software components. If the conversion of the second string fails, the first string which may represent the data in a markup language format may be converted to original software components. The data which is based on the original software components may be forwarded to the web browser 412 and displayed to the user. The user may then process the data accordingly.

In another example, the functionality associated with the application server 460 may be provided at the database server 470. Other variations may be realized through various embodiments of the invention.

The markup language format of the first string may be attuned to the computer language and electronic data it is storing. For example, the markup language format of the first string may not focus on human readability but may be considered easily readable for a software developer. The markup language format of the first string may provide a higher speed conversion of XML to and/or from in-memory computer information, as the format is not focused on being readable between company systems but is rather more concerned with high speed internal processing. As a result, XML generation and parsing may be performed at optimal speeds for the language involved. For example, a populated insurance application may take over 20 seconds to generate/parse XML according to standard procedures (e.g., a conventional life insurance XML). With the markup language of the first string, the same document may take less than 1 second to perform the same functions. Because parsing is a very CPU intensive activity, if a given computer is under heavy load, the ratio of gains may be dramatic.

FIG. 5 is an illustrative example of a markup language format, according to an embodiment of the invention. In the example of FIG. 5, object name identifies the name of a software component (or object) being described; name=root shows a top level object name; type identifies an actual class or code that is represented; attribute name identifies a piece of information that is stored within the software component; idref identifies a specific, unique identifier that may be assigned to a specific software component (or object), where attribute tags may have actual values, numbers, strings, etc. Other terms and/or tags may be implemented for various other applications.

An embodiment of the invention provides a platform, computer language and document agnostic method for rapidly storing and/or retrieving document data. While an exemplary embodiment involves Java™, virtually any other programming language may be implemented. Other types of servers, hardware, platforms may be implemented according to various embodiments of the invention.

Another embodiment of the invention allows the use of computer language unique features that may otherwise be risky to use, thereby providing various degrees of flexibility. According to an exemplary implementation, Java™ serialized objects may be used to enhance performance. For example, Java™ serialized objects may have a problem when Java™ itself, or a Java™ class is changed, upgraded or otherwise modified. In general, objects cannot be 'deserialized' due to such modifications. This problem may be substantial because of difficult recovery issues or data loss. However, because of the framework's use of the markup language format of the first string as a neutral language and reasonably fast alternate data storage mechanism, serialized objects that may comprise the second string may be implemented with little or no risk. Therefore, if the conversion of the serialized objects of the second string fails or is somehow compromised, the first string having the markup language format may be immediately converted. Other computer languages may have unique features comparable to Java™ serialized objects where the markup language format of the first string may be used as a primary or backup source of information.

The various embodiments of the invention provide a computer network friendly framework where information is able to traverse large distances, even continents, if so desired. By compressing the data, the total data size is kept to a minimum. An example of the data transmission technique of an embodiment of the invention involves a life insurance application where the document with no data, modeled in XML, may comprise approximately 150 kilobytes in size. With no data, the serialized software components (e.g., serialized Java™ objects) that represent this document may become more than 30 kilobytes in size. With compression, the combined first string (e.g., markup language string) and second string (e.g., serialized objects) may become less than 8 kilobytes in size before transmission. This may even be improved further with advanced compression algorithms. The work that follows the initial transmission which may involve processing of the data, may be heavyweight as far as networking, processing, and database activities are concerned. Because the data may be transmitted to a local environment (e.g., LAN or local area network as opposed to WAN or wide area network), the heavy activity may remain centralized which is highly advantageous and more efficient for computer networks.

The generalized feature of the embodiments of the invention may be used in various industries and in many different types of applications. One exemplary embodiment involves a life insurance focused application. The document data persistence framework concept of various embodiments of the invention may accommodate virtually any document type, where the information may be described in a logical fashion such as attribute name and value (e.g., Name=Fred, etc.).

In addition, the various embodiments of the invention may be beneficial for asynchronous and other processing. The collection of data and transport of data may be allowed to cleanly become separate activities from the processing of data. Because the saving of data may become an unrelated transaction from the effort of processing the data, the response time of this first transaction may remain short. Further, the data may be stored as a single entry into a database, a file system or other storage mechanism. As a result, remote users and/or servers may transmit data in a few seconds or less and then move on to the next task with minimal or no further delay. The separate processing activities, by users or computers, may then occur next, as a separate activity.

Various aspects of the invention allow separate computer systems to function together in various combinations. For example, a data entry system may interact with a data processing system on different platforms. Although this concept may revolve around asynchronous processing and around platform agnostic features, the software systems involved may be very much unrelated. For example, the document data entry system may be visual basic running with Optical Character Recognition (OCR) and residing on desktops, which may involve performing the data collection and saving, yet the data processing system may be performed on a mainframe picking up this information to process, which may involve performing the data retrieval and processing.

According to an embodiment of the invention, the systems and processes described in various aspects of the invention may be implemented on any general or special purpose computational device, either as a standalone application or applications, or even across several general or special purpose computational devices connected over a network and as a group operating in a client-server mode.

According to another embodiment of the invention, a computer-usable and writeable medium having a plurality of computer readable program code stored therein may be provided for practicing the process of the invention. The process and system of the invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the invention may comprise computer readable program code in the form of functional instructions stored in the computer-usable medium such that when the computer-usable medium is installed on the system or systems, those components cause the system to perform the functions described. The computer readable program code for the invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to an embodiment of the invention, the system may comprise components of a software system. The system may operate on a network and may be connected to other systems sharing a common database. Other hardware arrangements may also be provided.

Other embodiments, uses and advantages of the embodiments of the invention will be apparent to those skilled in the art from consideration of the specification and practice of the invention disclosed herein. The specification and examples should be considered exemplary only. The intended scope of the embodiments of the invention is only limited by the claims appended hereto.

While the invention has been particularly shown and described within the framework of storing and/or retrieving document data, it will be appreciated that variations and modifications can be effected by a person of ordinary skill in the art without departing from the scope of the invention. For example, one of ordinary skill in the art will recognize that storing and/or retrieving document data may involve various software components and may be applied to numerous different applications. Furthermore, one of ordinary skill in the art will recognize that such processes and systems do not need to be restricted to the specific embodiments described herein.

The invention claimed is:

1. A method for storing data entered by a user in a remote relational database, the method comprising the steps of:
 saving data as a plurality of software components at a server;

converting the plurality of software components into a first string and a second string wherein the first string comprises a markup language format that substantially mimics the software components and the second string comprises a serialized string format of the plurality of software components;
compressing the first string and the second string;
transmitting the compressed first string and the compressed second string to a receiving server; and
storing the compressed first string and the compressed second string in a relational database.

2. The method of claim 1, wherein the markup language format uses string concatenation.

3. The method of claim 1, wherein the compressed first string and the compressed second string are stored in a document data table.

4. The method of claim 3, wherein the compressed first string and the compressed second string are stored as a single record within the document data table.

5. The method of claim 4, wherein the compressed first string and the compressed second string are in binary format.

6. A computer program of instructions embodied on a storage media configured to be readable by at least one processor for instructing the at least one processor to execute a computer process for performing the method as recited in claim 1.

7. A method for retrieving data from a remote relational database, as requested by a user at a user location, the method comprising the steps of:
requesting data from a relational database through a requesting server;
retrieving a compressed first string and a compressed second string from a relational database;
transmitting the compressed first string and the compressed second string to the requesting server;
decompressing the compressed first string and the compressed second string;
converting the second string to an original plurality of software components wherein the second string represents a serialized string format of the plurality of software components comprising a string of characters;
determining whether the second string was converted;
converting the first string to an original plurality of software components if the second string was not converted, wherein the first string represents a markup language format that substantially mimics the software components;
displaying the original plurality of software components via a user interface;
determining that the conversion of the second string has failed; and
based on such derermination, that the conversion of the second string has failed, performing a further conversion process on the first string to convert the first string to software components.

8. The method of claim 7, wherein the markup language format uses string concatenation.

9. The method of claim 7, wherein the compressed first string and the compressed second string are retrieved from a document data table.

10. The method of claim 9, wherein the compressed first string and the compressed second string retrieved as a single record within the document data table.

11. The method of claim 10, wherein the compressed first string and the compressed second string are in binary format.

12. A computer program of instructions embodied on a storage media configured to be readable by at least one processor for instructing the at least one processor to execute a computer process for performing the method as recited in claim 7.

13. A system for storing data entered by a user in a remote relational database, the system comprising:
a server for saving data as a plurality of software components wherein the data is entered by the user;
a convert module for converting the plurality of software components into a first string and a second string wherein the first string comprises a markup language format that substantially mimics the software components and the second string comprises a serialized string format of the plurality of software components;
a compress module for compressing the first string and the second string;
a transmit module for transmitting the compressed first string and the compressed second string to a receiving server; and
a relational database for storing the compressed first string and the compressed second string.

14. The system of claim 13, wherein the markup language format uses string concatenation.

15. The system of claim 13, wherein the compressed first string and the compressed second string are stored in a document data table.

16. The system of claim 15, wherein the compressed first string and the compressed second string are stored as a single record within the document data table.

17. The system of claim 16, wherein the compressed first string and the compressed second string are in binary format.

18. A system for retrieving data from a remote relational database, as requested by a user at a user location, the system comprising:
a requesting server for requesting data from a relational database;
a retrieve module for retrieving a compressed first string and a compressed second string from a relational database;
a transmit module for transmitting the compressed first string and the compressed second string to the requesting server;
a decompress module for decompressing the compressed first string and the compressed second string;
a convert module for converting the second string to an original plurality of software components wherein the second string represents a serialized string format of the plurality of software components comprising a string of characters; determining whether the second string was converted; and converting the first string to an original plurality of software components if the second string was not converted, wherein the first string represents a markup language format that substantially mimics the software components; and
a user interface for displaying the original plurality of software components.

19. The system of claim 18, wherein the markup language format uses string concatenation.

20. The system of claim 18, wherein the compressed first string and the compressed second string are retrieved from a document data table.

21. The system of claim 20, wherein the compressed first string and the compressed second string retrieved as a single record within the document data table.

22. The system of claim 21, wherein the compressed first string and the compressed second string are in binary format.

23. A computer program of instructions embodied on a storage media configured to be readable by at least one processor to execute a computer process for storing data entered by a user in a remote relational database, the computer process comprising:
- saving step for saving data as a plurality of software components at a server;
- converting step for converting the plurality of software components into a first string and a second string wherein the first string comprises a markup language format that substantially mimics the software components and the second string comprises a serialized string format of the plurality of software components;
- compressing step for compressing the first string and the second string;
- transmitting step for transmitting the compressed first string and the compressed second string to a receiving server; and
- storing step for storing the compressed first string and the compressed second string in a relational database.

24. A computer program of instructions embodied on a tangible media configured to be readable by at least one processor to execute a computer process for retrieving data from a remote relational database, as requested by a user at a user location, the computer process comprising:
- requesting step for requesting data from a relational database through as requesting server;
- retrieving step for retrieving a compressed first string and a compressed second string from a relational database;
- transmitting step for transmitting the compressed first string and the compressed second string to the requesting server;
- decompressing step for decompressing the compressed first string and the compressed second string;
- converting step for converting the second string to an original plurality of software components wherein the second string represents a serialized string format of the plurality of software components comprising a string of characters;
- determining step for determining whether the second string was converted;
- converting step for converting the first string to an original plurality of software components if the second string was not converted, wherein the first string represents a markup language format that substantially mimics the software components; and
- displaying step for displaying the original plurality of software components via a user interface.

* * * * *